Patented Sept. 15, 1925.

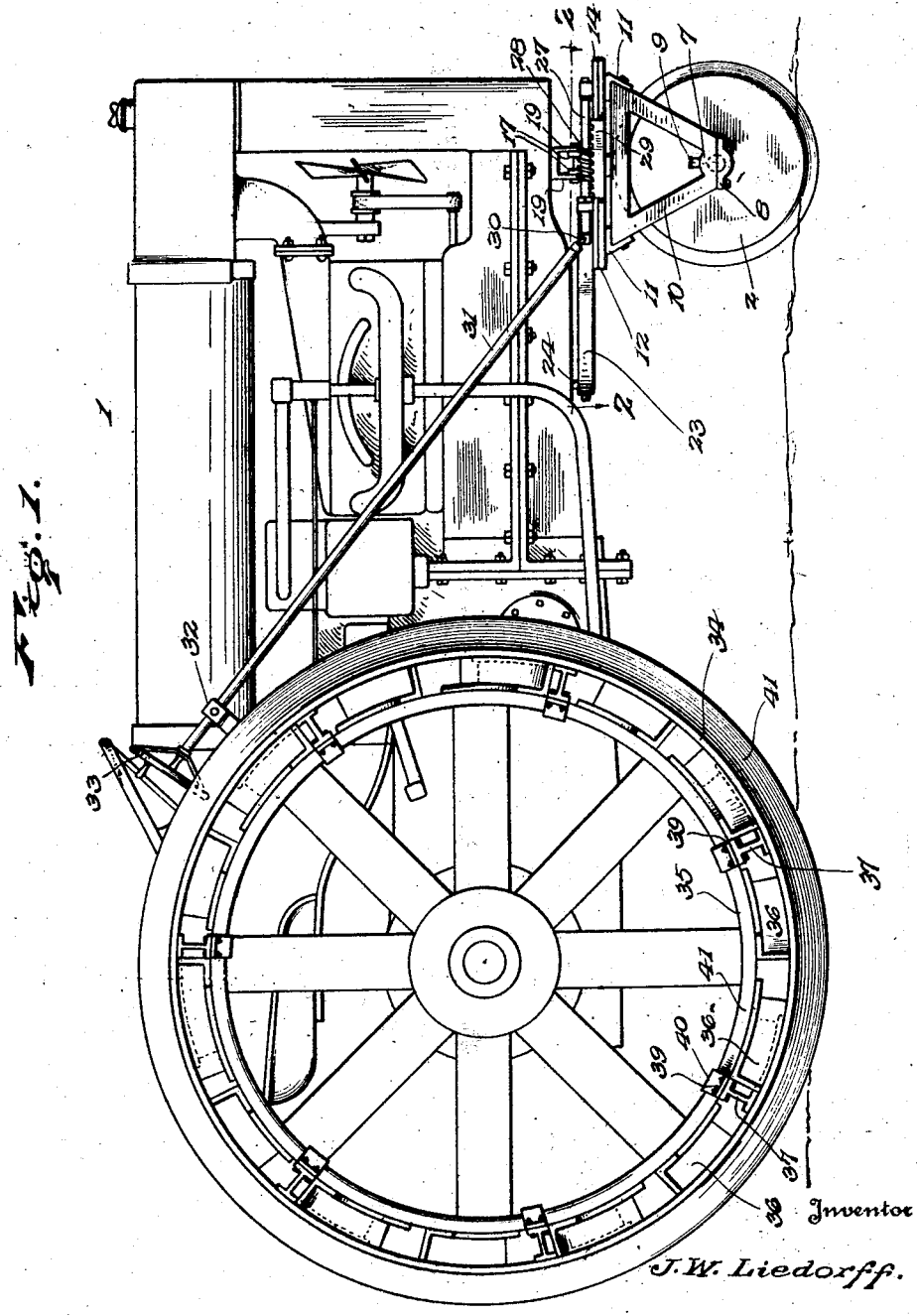

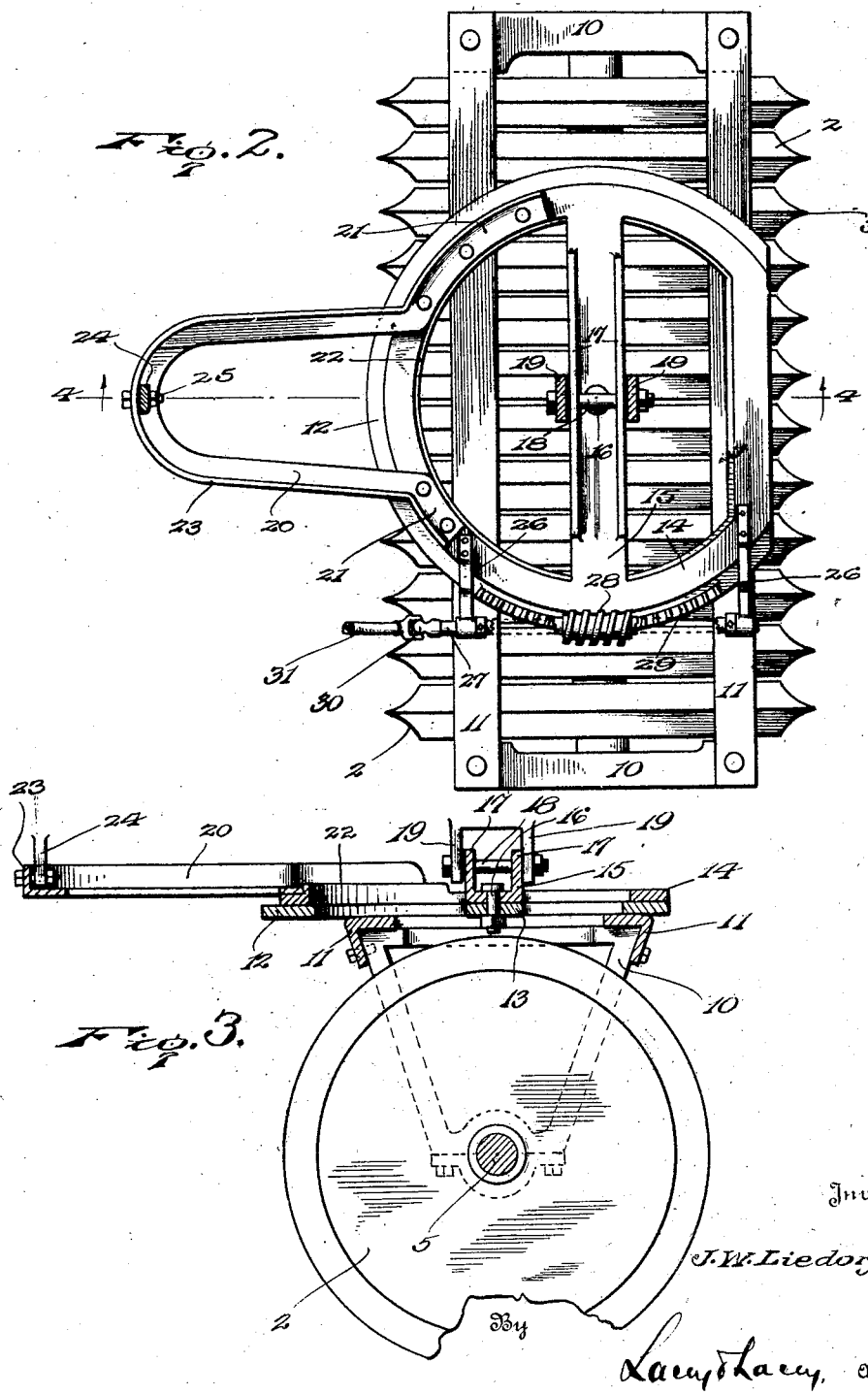

1,553,450

UNITED STATES PATENT OFFICE.

JAMES W. LIEDORFF, OF CALLAO, MISSOURI.

CULTIVATOR ATTACHMENT FOR TRACTORS.

Application filed October 9, 1922. Serial No. 593,301.

*To all whom it may concern:*

Be it known that I, JAMES W. LIEDORFF, a citizen of the United States, residing at Callao, in the county of Macon and State of Missouri, have invented certain new and useful Improvements in Cultivator Attachments for Tractors, of which the following is a specification.

This invention relates to agricultural implements and has for its object the provision of means whereby an ordinary farm tractor may be converted into a machine for cultivating and packing the soil. The invention seeks to provide means which may be readily attached to the tractor and serve as rolling supports for the same whereby, as the tractor is driven over the field, the surface of the soil will be pulverized and made firm to constitute a seed bed. The invention is illustrated in the accompanying drawings and will be hereinafter fully set forth.

In the accompanying drawings—

Figure 1 is a side elevation of a well-known farm tractor equipped with my improvements;

Fig. 2 is a top plan view of the forward ground-treating instrumentality, parts being shown in section on the line 2—2 of Fig. 1;

Fig. 3 is a vertical section on the line 4—4 of Fig. 2;

The tractor 1 may be of any well-known model and in itself forms no part of my invention. In carrying out my invention, I jack up the forward end of the tractor and substitute for the steering wheels ordinarily attached thereto a ground-treating instrumentality comprising a plurality of rollers 2 having their peripheries tapered from their medial lines to their sides producing ridges 3. The rollers may be formed in any convenient or preferred manner and are provided centrally with bosses 4 which will abut when the rollers are assembled in a gang so that the individual units will be maintained in a proper spaced relation upon the axle 5. The axle is equipped at its ends with annular flanges or ribs 6 which seat in annular grooves formed in the opposed faces of the half bearings 7 and the caps 8 opposed to the under sides of the respective half bearings and secured thereto by stud bolts in a well-known manner, an oil cup 9 being carried by each half bearing for an obvious purpose. The half bearing 7 is formed at the lower end of a triangular bracket or end frame 10 and the two end frames are connected by frame bars 11 having the proper cross sectional outline to fit closely to the upper corners of the end frames. A firm and strong structure is thus produced so that the rollers will be held together and may rotate freely as the machine is driven over the field. Upon the frame bars 11 at the centers thereof, I secure a turntable 12 consisting substantially of an annulus or flat circular member having a cross bar 13 rigid therewith, the said cross bar being preferably an integral part of the turntable. Resting on the turntable 12 is an upper ring or annulus 14 which has a truss 15 formed upon one diameter of the same and arranged to lie directly over the cross bar 13 when the machine is traveling straight ahead. A pivot bolt 16 is fitted vertically through the truss 15 and the cross bar 13 at the centers of the same and through the side webs or flanges 17 of the truss a horizontal pivot bolt 18 is fitted, the said bolt 18 being also extended through lugs 19 which depend from the body of the tractor and normally furnish means for attaching the front support of the tractor steering wheels. Secured rigidly to the member 14 and extending rearwardly therefrom is an attaching bracket or radius arm 20 which is substantially U-shaped in its main portion and has curved arms 21 extending from its forward extremities to lie upon the member 14 and bear against the upstanding rib 22 thereon. The curved arms 21 are secured to the member 14 by bolts or rivets in an obvious manner. The radius arm is reinforced by an upstanding rib 23 which follows the outline of the arm and is preferably formed at the outer edge of the same. Through the rear portion of the said rib 23 and a lug 24 depending from the body of the tractor, a pivot bolt 25 is inserted and the said pivot bolt is in axial alinement with the pivot bolt 18, as will be readily understood. Upon the member 14, I secure the laterally projecting bearing arms or brackets 26 and in the said arms or brackets I journal a shaft 27 having a worm 28 thereon meshing with a worm gear or rack 29 formed on the adjacent edge of the turntable 12, as clearly shown in Fig. 2. Connected by a universal joint 30 to the rear end of the shaft 27 is an operating steering shaft 31 which extends upwardly and rearwardly from the said shaft 27 and has its upper rear portion journaled in a bracket 32 upon the body of the tractor, a hand wheel 33 being provided upon the rear extremity of the said steering shaft. It will be readily understood that rotation of the shaft 31 will be transmitted directly to the shaft 27 and thence to the worm 28 so that the rack or gear 29 will be caused to move forwardly or rearwardly and, consequently, a turning movement will be imparted to the gang of rollers so that it will assume an angular position relative to the body of the tractor and the machine caused thereby to follow any desired course.

After the gang of rollers 2 has been secured in position under the forward end of the tractor in the described manner and by the described means, the rear end of the tractor is jacked up and cylindrical shells 34 are secured about the rear driving wheels 35 of the tractor and about the traction cleats 36 upon the peripheries of said wheels. To the inner circumferential surface of each shell, I secure a plurality of beams or I-shaped bars 37 which extend across the shell, as will be readily understood upon reference to Fig. 1. To the surface of each bracing beam 37 remote from the shell 34 I secure a clip plate 39 having a hooked terminal 40 adapted to engage over the flange or rib 41 at the edge of the tractor wheel 35, as shown in Fig. 1 and the ground-engaging surface of the shell is formed to present annular circumferential ridges like the ridges presented by the front rollers.

The shells 34 having been secured in proper position upon the rear wheels of the tractor in the described manner, the rear portion of the tractor is lowered so that the said shells will rest upon the ground and the tractor is then operated in the usual manner so as to travel over the field. In its travel, the tapered ridges presented by the front gang of rollers and the shells upon the rear wheels will cut into the surface of the soil and will divide and turn aside the same so that it will be effectually loosened, any roots which may be present being cut and clods or lumps or dirt being thoroughly pulverized. At the same time the troughs presented by the rollers and shells will serve to pack the turned over portions of the soil so that the surface will be made firm and moisture which may be in the soil below the surface will be conserved.

My invention provides mechanism which may be produced at a reasonable cost and readily applied to any tractor at a slight expense and without requiring skilled labor. Where my devices are provided, the farmer is enabled to readily and easily perform whatever operations may be needed to bring his soil into proper condition for the planting of a crop or cultivating a young crop without being required to provide a large number of separate implements. The mounting for the front gang of rollers permits the rollers to follow any inequalities in the surface of the ground without disturbing the level of the tractor and also permits the said front gang to be shifted angularly relative to the tractor so that the steering of the tractor will be easily accomplished while at the same time the gang will be firmly held in a set angular relation to the tractor.

Having thus described the invention, what is claimed as new is:

An attachment for tractors comprising a rigid frame to be disposed transversely beneath the front end of a tractor, a gang of rollers mounted in said frame, a turntable secured rigidly on top of said frame at the center thereof, a flat ring disposed over and resting directly upon said turntable and provided with a transverse diametric truss, a vertical pivotal connection between the said truss and the turntable at the centers of the same, a radius arm secured rigidly to the said ring and projecting rearwardly therefrom, a horizontally disposed pivot adapted to connect the truss with the bottom of a tractor, said pivot being disposed in a vertical plane of the vertical pivot, a horizontally disposed pivot adapted to connect the rear end of the radius arm with the bottom of the tractor and alined axially with the first horizontal pivot and disposed along the medial longitudinal line of the tractor, and means for moving the turntable about the vertical pivot.

In testimony whereof I affix my signature.

JAMES W. LIEDORFF. [L. S.]